March 24, 1953 A. W. LAWSON, JR., ET AL 2,632,808
FILTER
Filed May 8, 1946 3 Sheets-Sheet 1

INVENTORS
ANDREW W. LAWSON, JR
ROBERTO M. FANO
BY M. C. Hayes
ATTORNEY

Patented Mar. 24, 1953

2,632,808

UNITED STATES PATENT OFFICE 2,632,808

FILTER

Andrew W. Lawson, Jr., Chicago, Ill., and Roberto M. Fano, Boston, Mass., assignors, by mesne assignments, to the United States of America as represented by the Secretary of the Navy Application May 8, 1946, Serial No. 668,031

11 Claims. (Cl. 178—44)

The present invention relates to a single cavity double-tuned filter. More particularly this invention relates to the use of two or more separate modes of oscillation in a cavity resonator in order that a single cavity resonator may behave like two or more separate cavity resonators in cascade.

Previous efforts to devise a double-tuned filter from a single cavity have depended upon simultaneous generation of two or more modes of oscillation from the input probe or loop. Simultaneous excitation has been effected by placing a loop input in one corner of a rectangular cavity resonator. The orientation of this coupling loop with respect to the $x$, $y$, and $z$ planes of the rectangular cavity has determined which modes will be generated. A similar output coupling loop similarly oriented has been placed in a diagonally opposite corner of the cavity. The first of these resonators employed harmonic modes of the frequency of the energy being coupled to the resonator, but successive models employed the fundamental mode. The basic idea of using a cavity resonator as a double-tuned filter finds immediate application in airborne radio-electrical equipment where weight and bulk are often the factors which determine the advisibility of incorporating a given model of radio-electrical equipment. However, certain features of airborne utilization such as vibration make the advisability of a resonator with wave guide inputs instead of probe inputs apparent. Further, the present invention provides greater simplicity than previous cavity resonator filters and greater breadth of application due to the fundamental difference in mode utilization which will be hereinafter disclosed.

Accordingly, an object of this invention is to provide a cavity resonator filter.

Another object of this invention is to provide a double-tuned cavity-resonator filter.

A further object of this invention is to provide a cavity-resonator filter which may have a plurality of resonant frequencies.

Other and further objects of this invention will become more readily apparent upon consideration of the following discussion and the accompanying drawings of which:

Figure 4A:
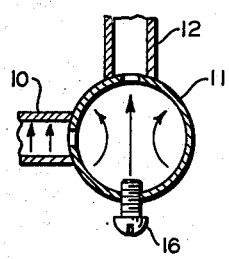
Figure 4B:
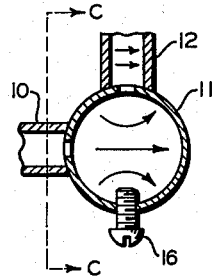
Figure 4C:
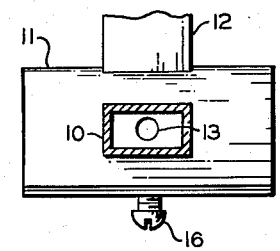
Figure 6:
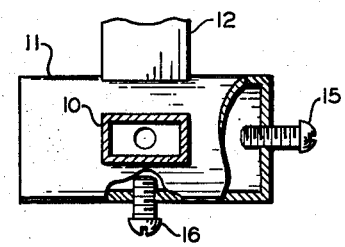
Figure 5:
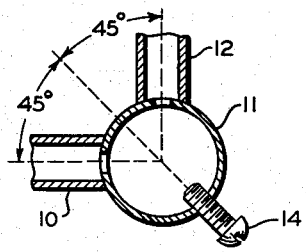

Figs. 4A, 4B, and 4C are views of an embodiment of this invention in the form of a cylindrical cavity resonator with wave guide input and output;

Fig. 5 is a diagram illlustrating coupling means of the embodiment of Figs. 4A, 4B, and 4C;

Fig. 6 is a diagram illustrating tuning means of the embodiment of Figs. 4A, 4B, and 4C; and Figs. 7A, 7B, 7C, and 7D are various views of an embodiment of this invention in the form of a square cavity resonator.

Figure 1:
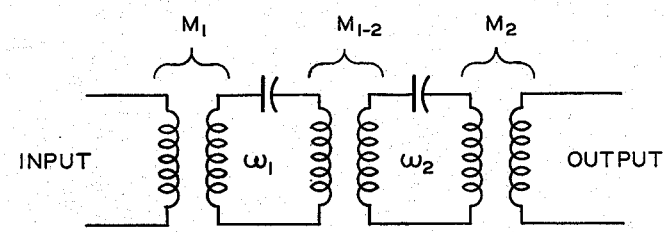
Fig. 1 is a schematic diagram of a lumped-element network filter of two sections, individually tuned.
Figure 2:
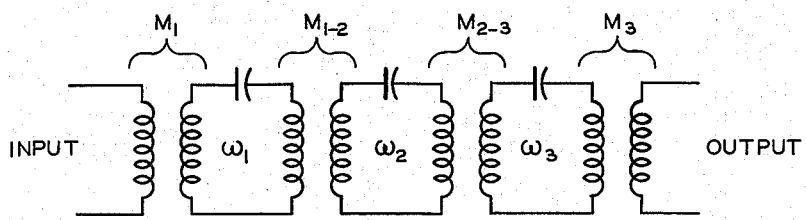
Fig. 2 is a schematic diagram of a lumped-element network filter of three sections, individually tuned.

Consider a cavity resonator having more than one normal mode of oscillation in a certain band of frequencies. Different polarizations of the same mode are considered as separate modes for the purposes of the present discussion. Let this cavity be coupled to an input line and to an output line in such a way that the input line is coupled to one of the modes only and the output line is coupled solely to the other mode. It follows that no power can be transmitted through the cavity. If the two modes are coupled to one another by suitable means a circuit is established whose lumped-element equivalent circuit is given by Fig. 1. The two resonant circuits, denoted by their angular frequencies $\omega_1$ and $\omega_2$, correspond to the modes of oscillation. The mutual inductances $M_1$ and $M_2$ represent the input and output couplings and the mutual inductance $M_{1-2}$ represents the coupling between the two modes. This same philosophy can be applied to a cavity resonator having three modes of oscillation in a certain band of frequencies. In this case one mode is coupled to the input line, the second mode is coupled to the other two modes, and the third mode is coupled to the output line as shown in the lumped-element equivalent circuit of Fig. 2. The extension of this philosophy to a larger number of modes is obvious.

Figure 3:
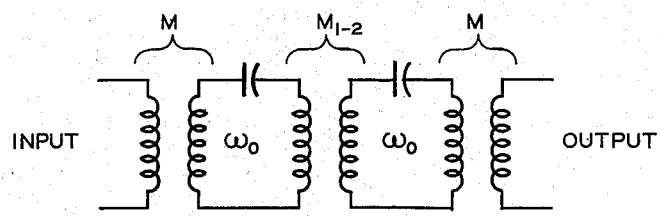
Fig. 3 is a schematic diagram of a lumped-element network filter of two sections, identically tuned.

A particular embodiment of this invention is the case of a double-tuned filter, the lumped-element equivalent circuit of which is given in Fig. 3. A very convenient practical realization of a double-tuned filter can be obtained by using a cylindrical cavity of circular cross section as illustrated in Figs. 4A, 4B, 4C, 5, and 6. The $TE_{11}$ mode for such a cavity has two independent polarizations as shown in Figs. 4A and 4B. The first polarization (Fig. 4A) is obtained when power is fed from guide 10 to resonator 11, while the second polarization (Fig. 4B) is obtained when power is fed from guide 12 to resonator 11. The two polarizations are considered as separate modes resonating at the same frequency.

Fig. 4C, a sectional view through plane C—C of Fig. 4B, illustrates coupling hole 13 which couples energy from guide 10 to resonator 11. A similar coupling hole exists between guide 12 and resonator 11. To make this structure analogous to the lumped-element equivalents circuit in Fig. 3 some means is needed of coupling the two modes, or polarizations, as they now exist in resonator 11. A suitable means of coupling is illustrated in Fig. 5. Screw 14 is inclined 45° from both the axis of guide 10 and the axis of guide 12 and is perpendicular to the wall of resonator 11. It may be seen examination of Figs. 4A and 4B in conjunction with Fig. 5 that screw 14 couples a portion of each of the electric fields whose polarizations are indicated in Figs. 4A and 4B. The resonant frequencies of both modes can be tuned by inserting screw 15 in either end plate of cavity 11 as illustrated in Fig. 6. If cavity 11 is not perfectly circular the two polarizations may resonate at slightly different frequencies. This difficulty can be overcome by tuning one of the modes separated by means of a radial screw parallel to its electric field. For example, screw 16 is shown in Fig. 6 placed parallel to the electric field of the mode of oscillation established by guide 10. Screw 16 is also shown in Figs. 4A and 4B. These figures show the electric vectors of the two modes and that screw 16 will affect only the mode of Fig. 4A, since it is perpendicular to the electric vectors of the mode illustrated in Fig. 4B.

Figs. 7A, 7B, 7C and 7D disclose an embodiment of this invention in the form of a cavity resonator of square cross section. Resonator 20 is shown in plan view in Fig. 7A and a sectional partial elevation view in Fig. 7B. Coaxial line 21 ends in input coupling loop 22, the plane of which is oriented along a diagonal of square cavity resonator 20. Similarly coaxial line 23 ends in output coupling loop 24, the plane of which is oriented along the other diagonal of resonator 20 and hence this plane of loop 24 is perpendicular to the plane of loop 22.

Figure 7C:
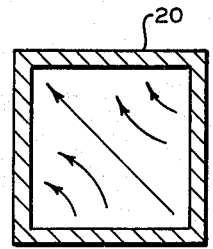
Figure 7A:
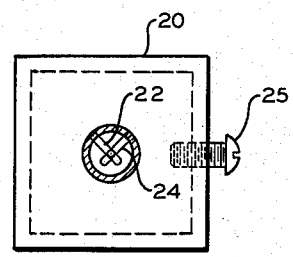
Figure 7D:
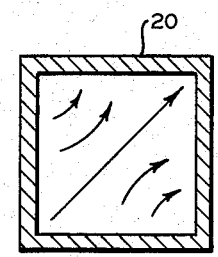
Figure 7B:
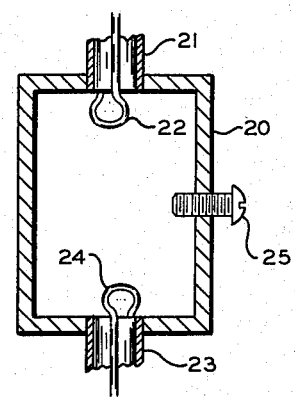

Figs. 7C and 7D are cross sectional views of the plan view of Fig. 7A and show the electric vectors of the fields generated by loops 22 and 24 respectively. In a manner similar to that presented above screw 25, which is placed in the center of the wall of cavity 20, couples together the two electric fields just mentioned and effectively controls the mutual inductance $M_{1-2}$ of the lumped-element equivalent circuit of Fig. 3, which holds for this embodiment as well as for the previously disclosed embodiment. Although the disclosed embodiment has employed coupling loops for simplicity of explanation, wave guide inputs with coupling apertures may be successfully employed. Since either coaxial or hollow wave guide inputs may be used in either of the disclosed embodiments, the term input line is defined as including both hollow and coaxial wave guides.

While the foregoing description has presented an explanation of this invention in the particular application of a single cavity double-tuned filter, the principles of this invention are of broader application in ways which will be apparent to those versed in the art. For example, a number of double-tuned filters of either of the types disclosed can be placed in cascade as is done with single-tuned cavities with a consequent two-fold reduction in space and weight. Accordingly, it will be understood that the above-disclosed embodiments are primarily illustrative and the invention includes such other embodiments as fairly fall within the spirit and scope of the appended claims.

What is claimed is:

1. A radio frequency structure comprising, a cavity resonator of circular cross-section capable of supporting energy in a plurality of modes of oscillation, a first wave guide section connected radially of said resonator for introducing energy thereto in a first mode of oscillation, a second wave guide section for extracting energy in a second mode of oscillation, said second wave guide being connected radially of said resonator and having its axis at an angle of 90° relative to that of said first wave guide section, and a screw penetrating said resonator wall and being retractable radially thereof, the axis of said screw forming angles of 45° relative to the axis of said first and second wave guide sections, said screw providing coupling of energy between said first and said second modes.

2. Apparatus as in claim 1 including a second screw penetrating an end wall of said cavity resonator, said second screw being retractable axially of said resonator for tuning the resonant frequency of said resonator.

3. A radio frequency structure comprising, a cylindrical cavity resonator capable of supporting energy in a plurality of modes of oscillation, a rectangular input wave guide attached to the circular wall of said cylindrical resonator, a first coupling iris between said rectangular input wave guide and said resonator for introducing energy thereto in a first of said plurality of modes, a rectangular output wave guide also attached to the circular wall of said resonator, a second coupling iris between said output wave guide and said resonator for extracting energy therefrom in a second of said plurality of modes, the longitudinal axes of said input and said output wave guides being coplanar but spaced apart about the circular wall of said cavity resonator by 90°, a first adjustable screw threaded into said circular wall of said cylindrical resonator, the axis of said first adjustable screw being at an angle of 45° relative to the longitudinal axes of said input and said output wave guides for coupling energy between said first and second modes, and a second adjusting screw threaded into an end wall of said cylindrical resonator for adjusting the resonant frequency thereof.

4. A radio frequency structure comprising, a cubical cavity resonator capable of supporting energy in two modes of oscillation having mutually perpendicular planes of polarization, a coaxial input line for introducing energy into said resonator in a first of said modes, a coaxial output line for extracting energy from said resonator in the other of said modes, and a retractable element adjacent said coaxial input and said coaxial output lines for providing coupling of energy between said first and said second modes of oscillation.

5. A radio frequency structure comprising, a cubical cavity resonator capable of supporting energy in a plurality of modes of oscillation, a coaxial input line having inner and outer conductors attached to a first wall of said cavity resonator, a coaxial output line having inner and outer conductors attached to a second wall of said cavity resonator, the inner conductors of said coaxial input and output lines being formed into loops, the plane of the loop of said input inner conductor being oriented perpendicular to the plane of the loop of said output inner conductor, and a retractable element penetrating a third wall of said cavity resonator, said third wall being adjacent said first and said second walls, the axis of said element being at an angle of 45° relative to the planes of said input and output coupling loops.

6. A radio frequency structure comprising, a cubical cavity resonator capable of supporting energy in a plurality of modes of oscillation, a coaxial input line having inner and outer conductors, the inner conductor of said input line being formed into a first coupling loop, said first coupling loop lying in the plane of a first diagonal of a section of said cubical resonator, a coaxial output line having inner and outer conductors, the inner conductor of said output line being formed into a coupling loop in the plane of a second diagonal of a section of said cubical resonator, said second diagonal being perpendicular to said first diagonal, said input and output coaxial lines being attached to opposite walls of said cubical resonator, and an adjustable screw penetrating a wall adjacent said opposite walls whereby energy introduced into said first cavity resonator in a first mode may be coupled out of said cavity resonator in a second mode, said adjustable screw providing coupling between said first and second modes.

7. A radio frequency filter comprising, a cavity resonator constructed and arranged to support oscillations at the same frequency in two modes oriented perpendicularly to each other, first coupling means connected to said resonator and arranged to excite oscillations therein only in one of said modes, second coupling means connected to said resonator and arranged to couple energy from only the other of said modes of oscillation, and a retractable tuning element in the wall of said cavity arranged adjustably to couple energy from said one mode of oscillations to the other.

8. A radio frequency filter comprising, a symmetrical cavity resonator dimensioned to support oscillations in two mutually perpendicular modes at the same frequency, first coupling means connected to said resonator and arranged to excite oscillations in said resonator only in a first of said modes, second coupling means disposed perpendicularly to said first coupling means and arranged to couple energy only from the other of said modes of oscillation, and a retractable tuning screw projecting into said resonator, the axis of said screw forming angles of 45° with the electric vectors of said two modes of oscillation, said screw thereby providing coupling of energy from said one mode of oscillations to the other.

9. A radio frequency structure comprising a cavity resonator of circular cross section constructed and arranged to support oscillations in two modes having planes of polarization mutually perpendicular to each other, a first wave guide connected radially of said resonator and arranged to excite oscillations only in one of said modes, a second wave guide connected radially of said resonator with its axis disposed at an angle of 90° relative to the axis of said first wave guide whereby said second wave guide is adapted to couple energy only from the other of said modes of oscillation, and a retractable tuning screw projecting radially into said resonator for providing adjustable coupling of energy from said one mode of oscillations to the other.

10. A radio frequency structure comprising a cavity resonator of circular cross section constructed and arranged to support oscillations in two modes having planes of polarization mutually perpendicular to each other, a first wave guide connected radially of said resonator and arranged to excite oscillations only in one of said modes, a second wave guide connected radially of said resonator with its axis disposed at an angle of 90° relative to the axis of said first wave guide whereby said second wave guide is adapted to couple energy only from the other of said modes of oscillation, and a retractable tuning screw projecting radially into said resonator for providing adjustable coupling of energy from said one mode of oscillations to the other, the axis of said screw forming angles of 45° relative to the axes of said first and second wave guides.

11. A radio frequency structure comprising a cavity resonator of circular cross section constructed and arranged to support oscillations in two modes having planes of polarization mutually perpendicular to each other, a first wave guide connected radially of said resonator and arranged to excite oscillations only in one of said modes, a second wave guide connected radially of said resonator with its axis disposed at an angle of 90° relative to the axis of said first wave guide whereby said second wave guide is adapted to couple energy only from the other of said modes of oscillation, a retractable tuning screw projecting radially into said resonator for providing adjustable coupling of energy from said one mode of oscillations to the other, the axis of said screw forming angles of 45° relative to the axes of said first and second wave guides, and a second retractable screw projecting axially into said resonator for adjusting the resonant frequency thereof.

ANDREW W. LAWSON, Jr.
ROBERTO M. FANO.

REFERENCES CITED

The following references are of record in the file of this patent:

UNITED STATES PATENTS

| Number | Name | Date |
|---|---|---|
| 2,357,313 | Carter | Sept. 5, 1944 |
| 2,357,314 | Carter | Sept. 5, 1944 |
| 2,401,425 | Hershberger | June 4, 1946 |
| 2,406,402 | Ring | Aug. 27, 1946 |
| 2,432,093 | Fox | Dec. 9, 1947 |
| 2,496,772 | Bradley | Feb. 7, 1950 |
| 2,513,334 | Kirkman et al. | July 4, 1950 |